No. 745,215. PATENTED NOV. 24, 1903.
A. G. MELHUISH.
GAS OR OIL ENGINE.
APPLICATION FILED MAY 16, 1902.
NO MODEL. 9 SHEETS—SHEET 1.
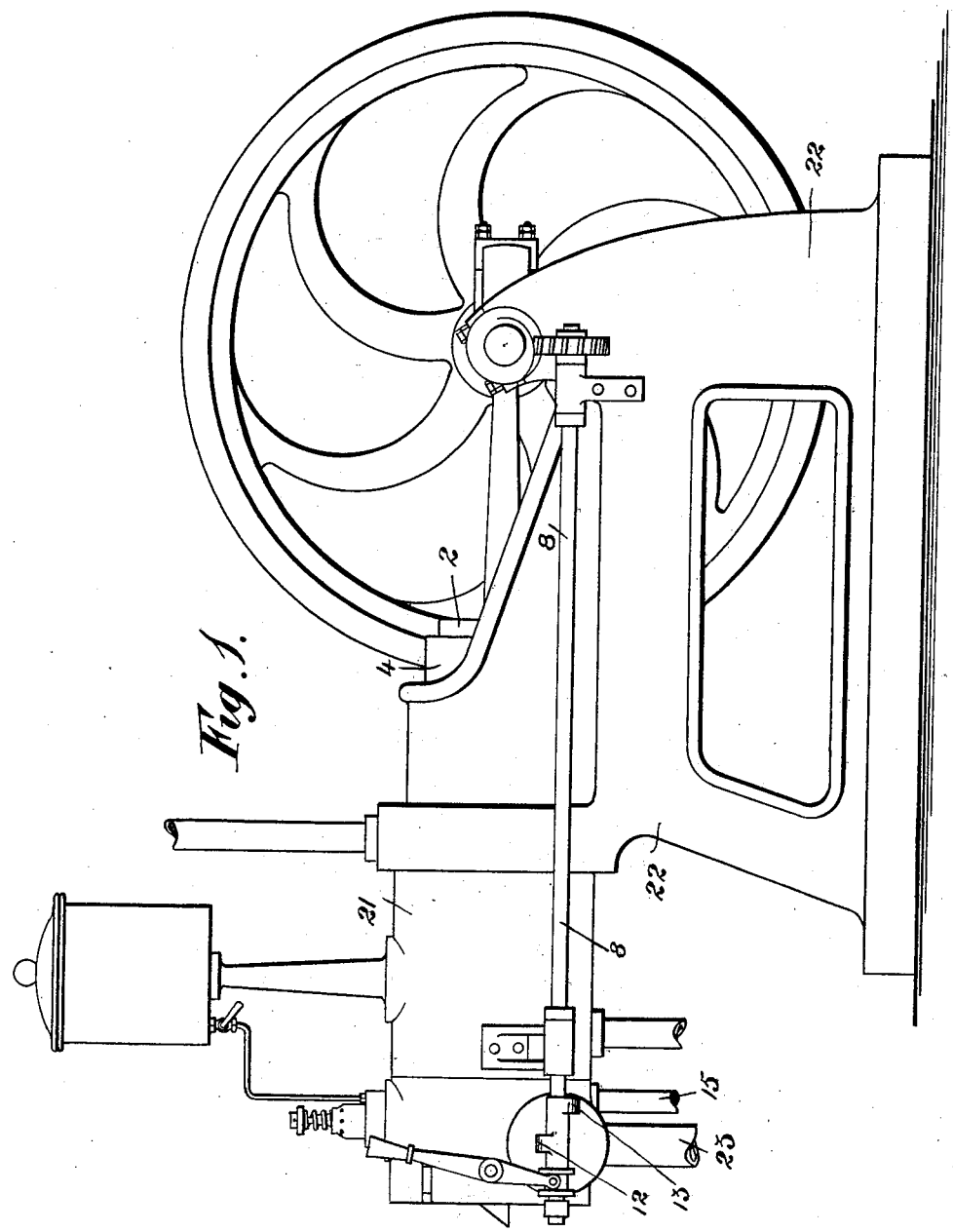
Witnesses:
Inventor
Alfred G. Melhuish
By James L. Norris.
Atty.

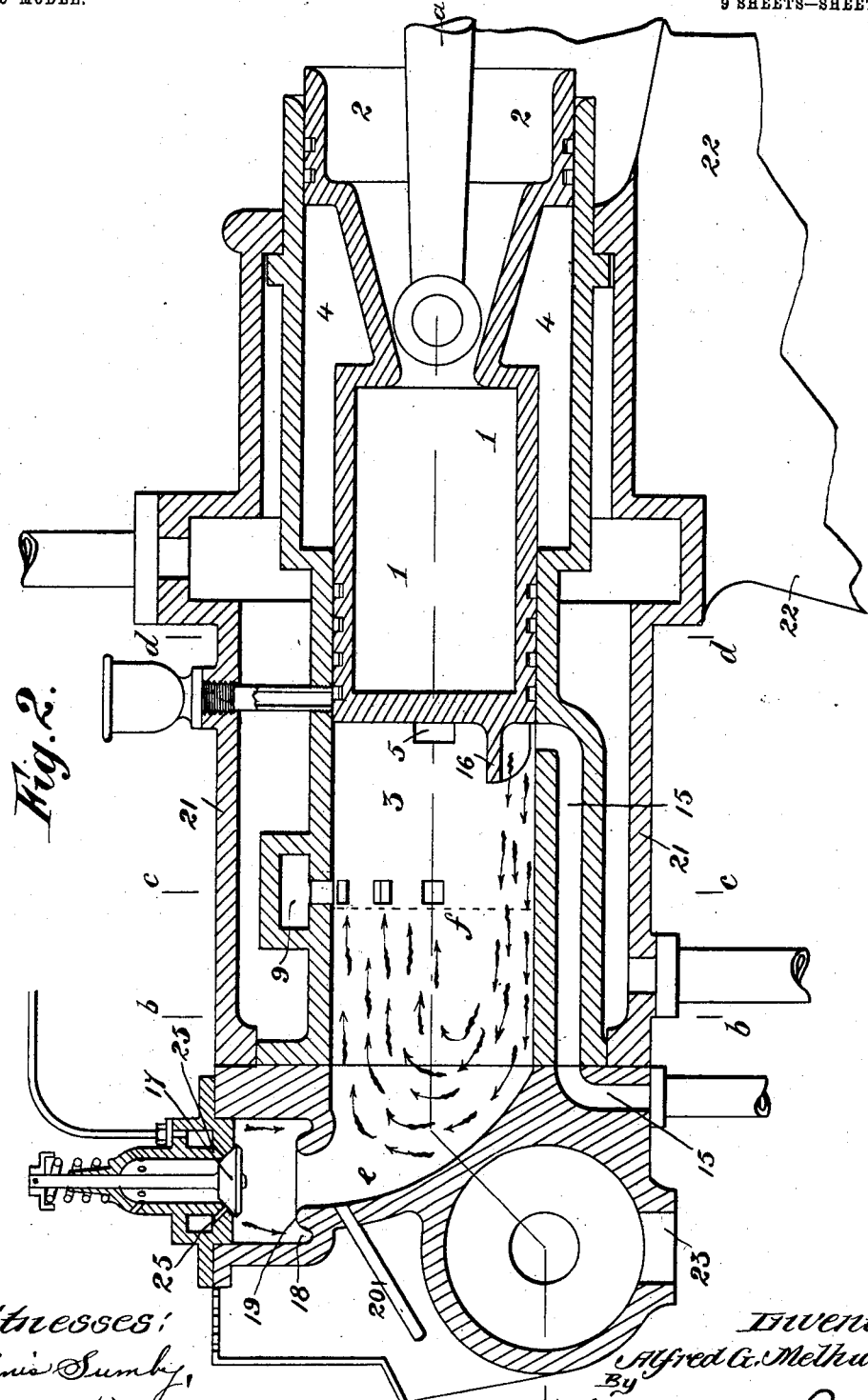

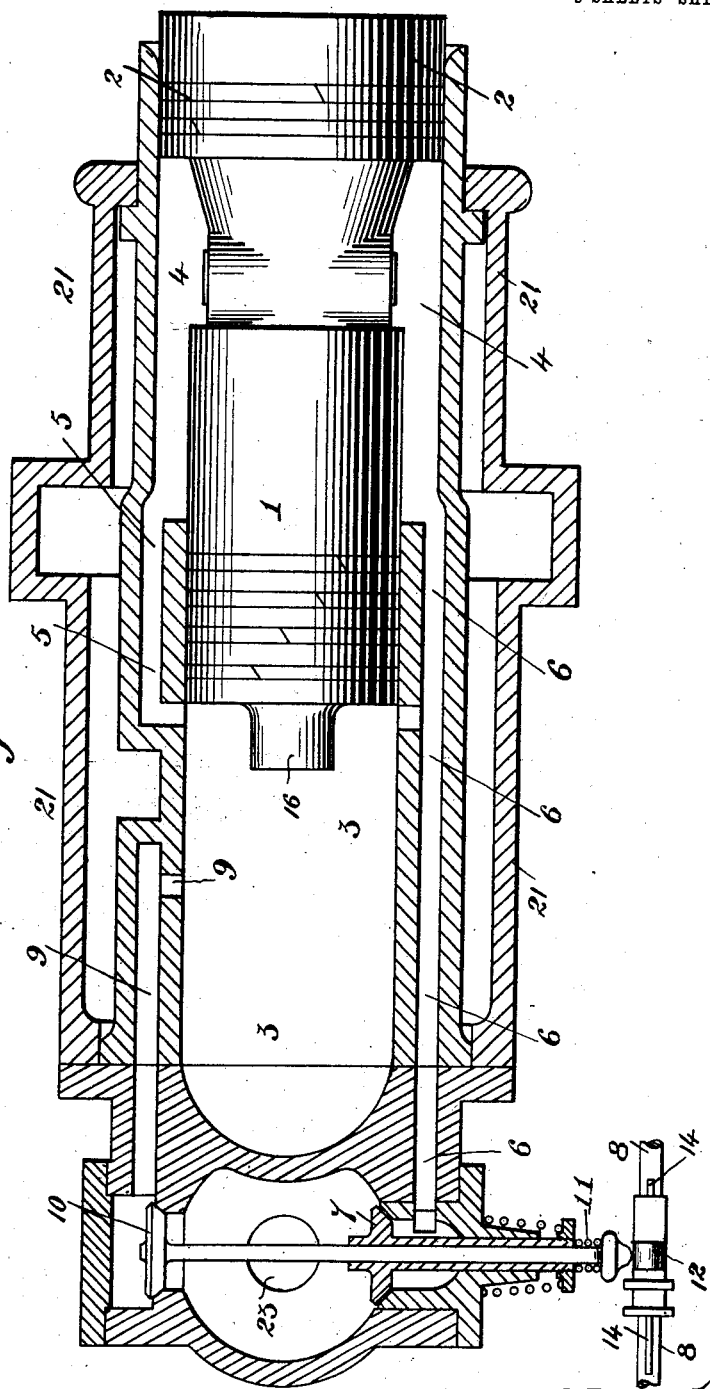

No. 745,215. PATENTED NOV. 24, 1903.
A. G. MELHUISH.
GAS OR OIL ENGINE.
APPLICATION FILED MAY 16, 1902.
NO MODEL. 9 SHEETS—SHEET 4.
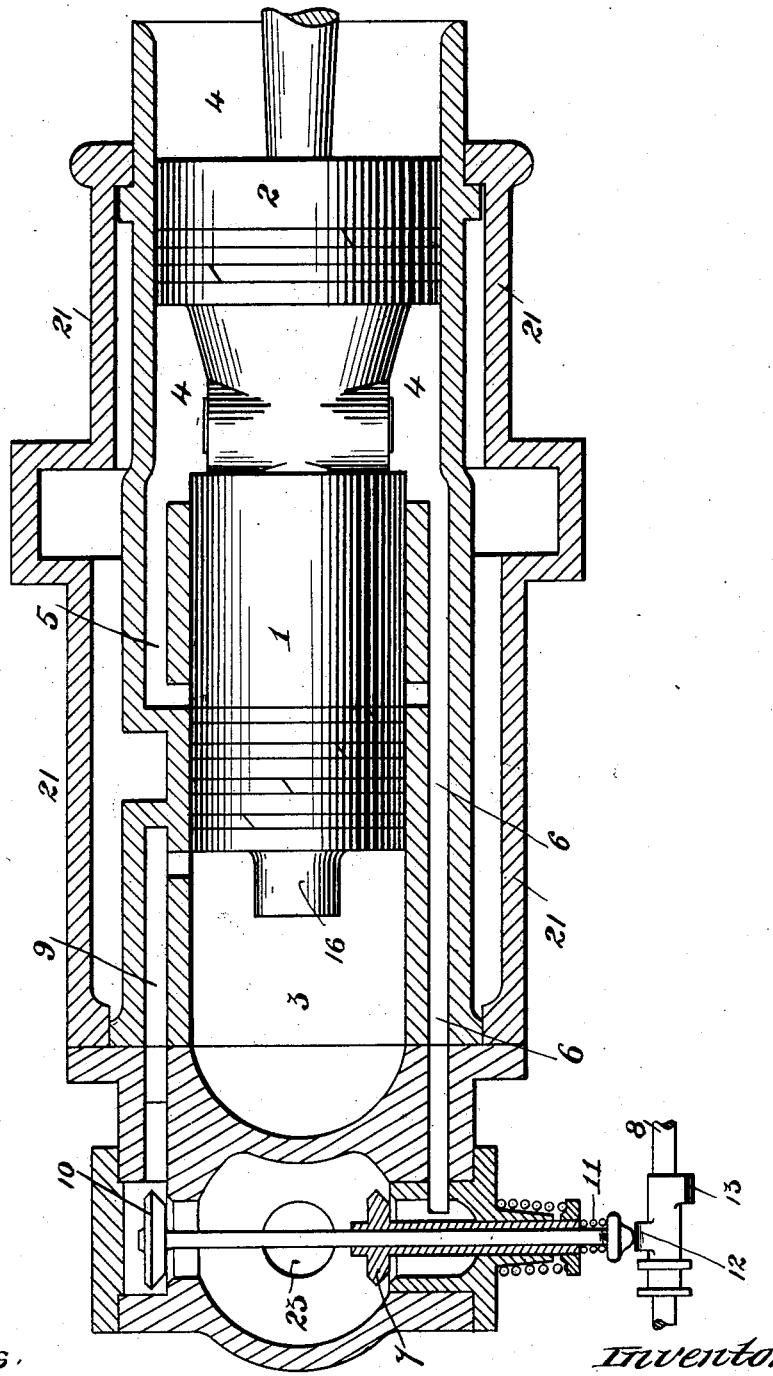

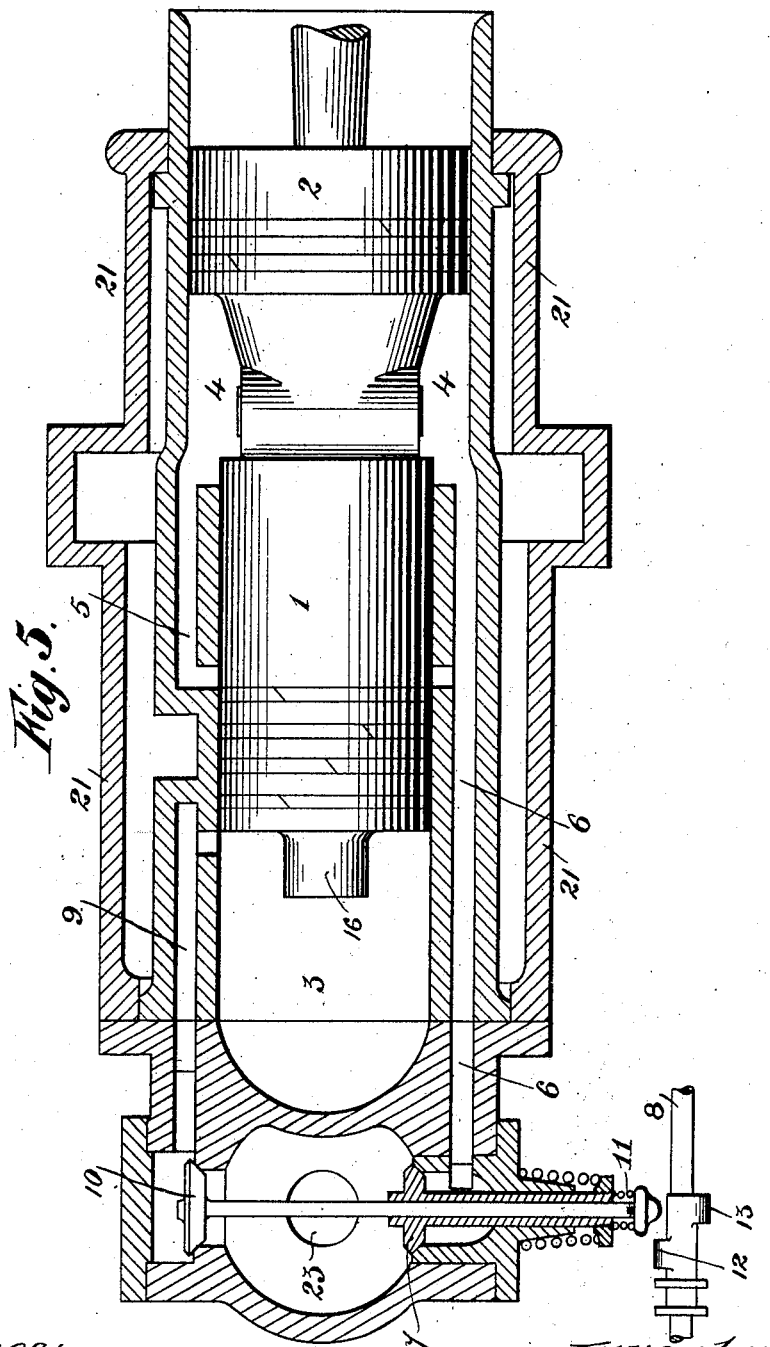

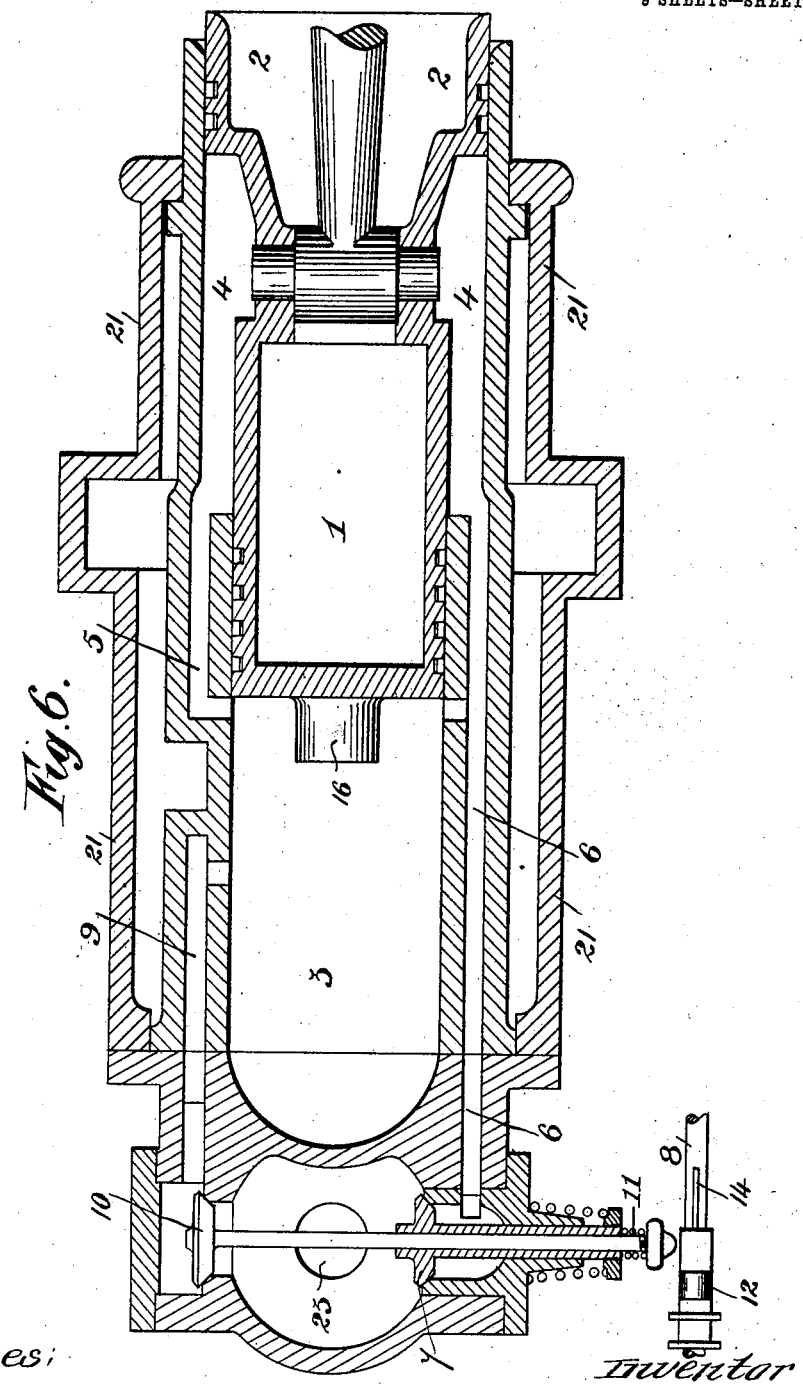

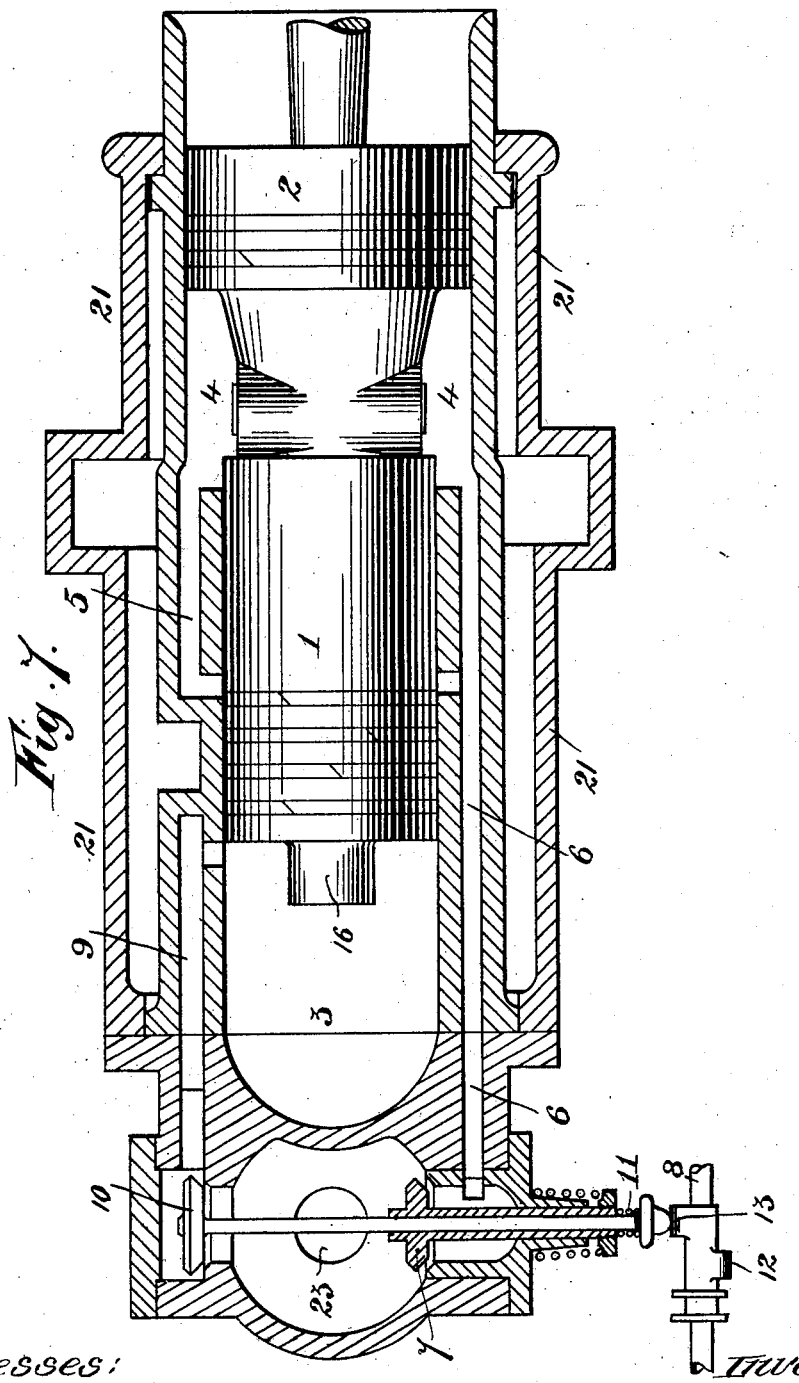

No. 745,215. PATENTED NOV. 24, 1903.
A. G. MELHUISH.
GAS OR OIL ENGINE.
APPLICATION FILED MAY 16, 1902.
NO MODEL. 9 SHEETS—SHEET 8.
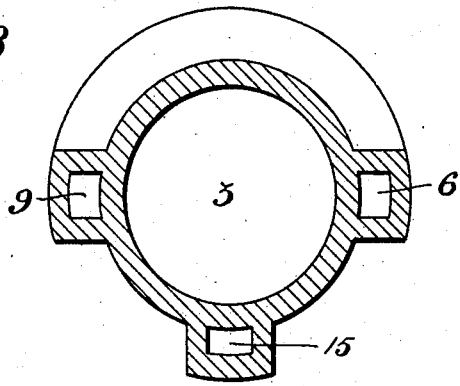
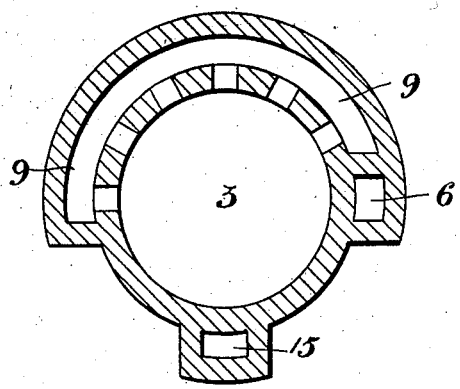
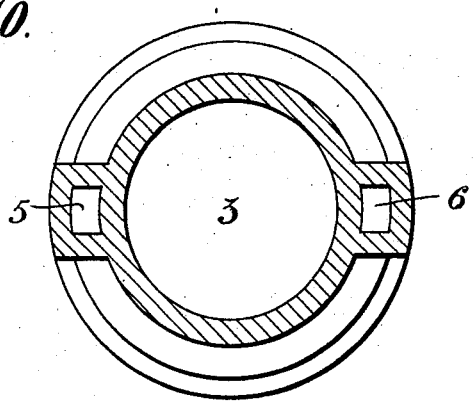

No. 745,215. PATENTED NOV. 24, 1903.
A. G. MELHUISH.
GAS OR OIL ENGINE.
APPLICATION FILED MAY 16, 1902.
NO MODEL. 9 SHEETS—SHEET 9.
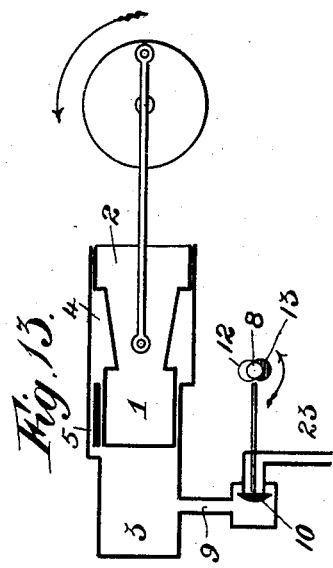
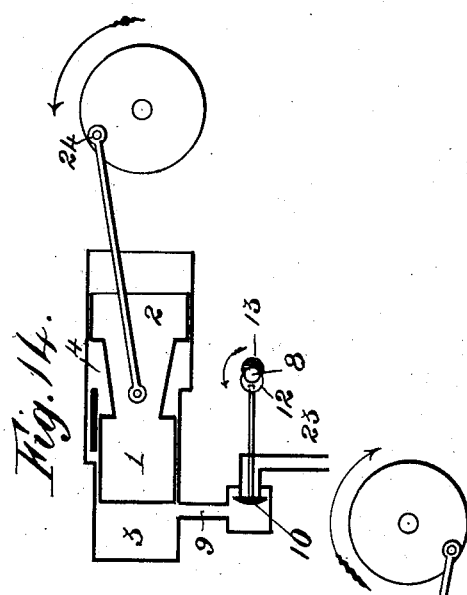
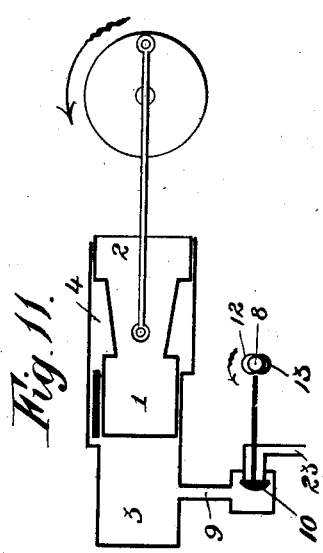
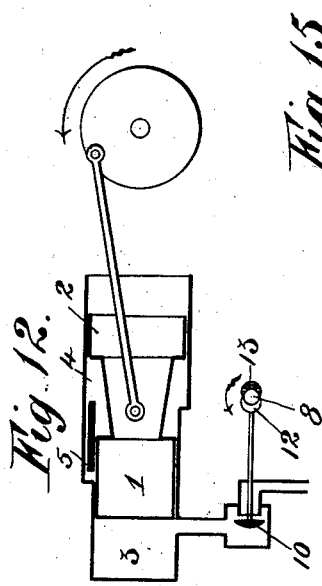
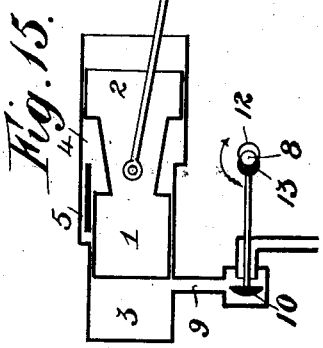
Witnesses:
Dennis Sumb
Inventor
Alfred G. Melhuish
By James L. Norris
Atty.

No. 745,215. Patented November 24, 1903.

UNITED STATES PATENT OFFICE.

ALFRED GEORGE MELHUISH, OF EDMONTON, ENGLAND.

GAS OR OIL ENGINE.

SPECIFICATION forming part of Letters Patent No. 745,215, dated November 24, 1903.

Application filed May 16, 1902. Serial No. 107,655. (No model.)

*To all whom it may concern:*

Be it known that I, ALFRED GEORGE MELHUISH, a subject of the King of Great Britain, residing at Gothic Works, Angel Road, Edmonton, county of Middlesex, England, have invented certain new and useful Improvements in and Connected with Gas or Oil Engines, of which the following is a specification.

This invention has for its object the construction of gas or oil engines with the following important points: First, insuring that a given volume of combustible mixture is after ignition expanded to double (more or less) its original volume; second, that the engine after once being started can be reversed in its direction of motion by the simple movement of a cam, and, moreover, to effect such reversal with certainty, the ignition being effected by a hot tube in the usual manner; third, to obtain an impulse every revolution; fourth, the particular formation of cylinder liner and ports whereby said engine can be more economically produced.

In the drawings hereto annexed I show the engine as being of the horizontal type; but it may be made vertical or inverted, according to the particular purpose for which it is intended to be used.

Figure 1 represents a side elevation of the engine, Fig. 2 being a section, upon an enlarged scale, of the cylinder, showing the location of some of the ports. Figs. 3, 4, 5, 6, and 7 are sectional plans on the lines *a a* of Fig. 2, the cylinder and piston showing the respective positions of the piston during a complete cycle of operations, while Figs. 8, 9, 10 are sections on the lines *b b*, *c c*, and *d d*, respectively, of Fig. 2. Figs. 11, 12, 13, 14, and 15 are diagrammatical views showing method of effecting the reversal of the engine.

In carrying my invention into practice I form the piston of differential diameters 1 2, working in correspondingly-sized cylinders 3 4, of which 3 is termed the "working" cylinder and 4 the "suction" or "vacuum" cylinder.

5 6 are ports that connect the working cylinder with the vacuum-cylinder when the piston 1 2 has completed its outstroke; but the port 6 is continued to the combustion-chamber, where it communicates with a non-return valve 7, opening outward to the exhaust by a cam on the lay-shaft 8.

On the opposite side of the cylinder 3 and at a point preferably half-way between the piston's complete instroke and outstroke is another port 9, which communicates with the exhaust by way of a valve 10, opening inward, the spindle of this valve passing through the spindle of the valve 7 and operable by the same cam. A short spring 11 is interposed between the two spindles to allow of a little latitude of movement of the two spindles, and thus insure the correct seating of the valves upon their respective seats.

The cams 12 13 are preferably of eccentric formation, formed in one piece of metal, and slidable upon a feather 14 on the lay-shaft 8. This lay-shaft is rotated, by means of skew-bevel or other gearing, from the crank-shaft and makes the same number of revolutions, or if the number of cams are multiplied in a radial plane of course the lay-shaft may make any correspondingly-varying number of revolutions to one revolution of the crank-shaft.

The air-inlet port 15 is formed in the bottom of the cylinder and has its opening to said cylinder at the piston's complete outstroke, the air as it enters being deflected inward by the deflector 16.

Oil mixed with a given and regulatable quantity of air enters by the valve 17, the oil being preferably conducted through holes 25 in the valve-seating, and as said oil and air enters the combustion-chamber it impinges upon the depression 18 around the upturned lip 19, which is kept hot at starting by an outside blow-lamp playing upon the ignition-tube 20 and afterward by the heat of the explosion. The cylinders 3 4 are made in one piece to form the liner, which is inserted in the outer cylinder or jacket 21, formed in a piece with the engine-bed 22, all the ports requiring communication with the atmosphere being formed as part of and alongside the cylinder 3 and conducted to the back end for connection to the exhaust-valves 7 and 10.

Having now described the general features of a gas or oil engine constructed according to my invention, I will now proceed to describe its cycle of operations.

Assuming that the piston is on its complete instroke and that a charge of combustible mixture has been compressed and fired, it then impels the pistons 1 and 2 outward until they assume the position shown in Fig. 2, and inasmuch as the fired charge has been thus expanded to twice its original volume before compression the pressure in the cylinder 3 will have dropped to about that of the atmosphere, the piston 2 on its outstroke having formed a partial vacuum in the cylinder 4, the valve 7 being closed.

It should be stated that the effective area of the piston 2 is equal to about half that of the piston 1. Consequently as soon as the piston 2 on its outstroke uncovers the port 5, establishing communication between the working and vacuum cylinders, the products of the previous explosion are withdrawn from the cylinder 5 equal in volume to the effective clearance volume of the cylinder 4, thus making at this time a partial vacuum in both cylinders. At its complete outstroke the piston uncovers the air-inlet port 15. The air then rushes in to destroy the partial vacuum and is deflected by the deflector 16 inward, according to the direction of the arrows, Fig. 2, and occupies a space equal to the points e to f and displaces the products partly into the cylinder 4 and partly to a position contiguous to the piston 1 from the point f to the piston-head. At the same instant rich oil-gas is being drawn through the valve 17 in the manner before described. Thus the rich oil-gas and pure air are intermixed at the combustion-chamber end to form an ignitible charge, while some air only remains to support combustion. The return stroke now commences. The valves 7 and 10 are commencing to open under the action of the cam 12. (See Fig. 3.) The instroke continuing causes the piston 2 to discharge the contents of the chamber 4 through the port 6 through the valve 7 to the exhaust-pipe 23, and the piston 1 pushes the products remaining next to it out by way of the port 9 through the valves 10 to the same exhaust-pipe 23. The piston has now arrived at the position shown in Fig. 4. Nothing but live mixture now remains, its volume being equal to about half of the full volume of the working cylinder. The piston completes its instroke, compresses the charge, which is fired by the tube 20, and the piston is again expelled outward, the valves 7 and 10 during this outstroke remaining closed. Consequently the ignited charges expand through the whole length of the cylinder and a vacuum or partial vacuum is again formed in the cylinder 4 to withdraw the products from the cylinder and introduce a new charge in the manner before described. Now assuming it is required to reverse the direction of running of the engine the method of so doing will be made clear on reference to the diagrams Figs. 11, 12, 13, 14, and 15, in which I have only shown the valve 10 as being the one chiefly concerned in this operation.

Referring to Fig. 11, the crank is assumed to be revolving in the direction of the arrow and the cams 12 and 13 also in the direction of the arrow. In Fig. 12 the crank has completed about half its instroke and the cam 12 has opened the valve 10 to allow the products to escape, the piston completing its instroke and compressing the charge to about, say, forty pounds per square inch, when at this pressure the hot tube becomes effective and the charge is ignited. If, on the other hand, the cam be slid along its shaft to cause the cam 13 to be opposite the spindle, as in Fig. 5, of which Figs. 13, 14, and 15 are diagrams, it will now be seen that if the crank be moving in the direction of the arrow and the cams also in the same direction that the cam 13, being the one opposite the valve 10, is moving away from the said valve, as is clear in Fig. 14. Consequently the piston on its inward stroke (the valve 10 being closed) will now compress the whole volume into the combustion-chamber, which being only of a capacity to receive half the volume to attain a pressure of forty pounds per square inch, with the result that double the pressure—say eighty pounds—is attained. Now inasmuch that the ignition-tube is so timed to ignite the charge at forty pounds per square inch it follows that as a result of the valve 10 remaining closed this condition is arrived at when the crank arrives at the point 24, Fig. 14. Ignition now takes place, with a rise of pressure sufficient to overcome the momentum of the fly-wheel and impel it in the opposite direction, when of course the cam 13 is in its proper relation to open the valve 10 and allow the compression to be at its normal condition, as is evident from Fig. 15. To again reverse, the cam must be slid along its shaft to bring the cam 12 opposite the spindle, when compression is again increased, and early firing takes place to cause the engine to run in the reverse direction. The essential feature of this part of the invention is the use of two connected cams in opposite phase, being so arranged as to cause and increase compression and early firing when either cam is moved out of phase with the then direction of motion of the crank-shaft.

What I do claim, and desire to secure by Letters Patent, is—

1. In a gas or oil engine, the combination of a working cylinder and a vacuum-cylinder; a two-part piston operating in said cylinder; means for supplying a charge of explosive material to said working cylinder; means for igniting said charge; a connection between said vacuum-cylinder and said working cylinder, whereby on the outstroke of the piston the exploded charge is withdrawn from said working cylinder into said vacuum-cylinder; an air-inlet in said working cylinder, so located that it is uncovered by said piston on its outstroke; an outlet from said vacuum-cylinder; an outlet from said working cylinder; a valve for each of said outlets; a stem for each of said valves; a revolving shaft; a longitudinally-slidable sleeve on said shaft, mounted to rotate therewith; a plurality of lugs mounted at different points on said sleeve, each adapted to contact at different times with said valve-stems; and means for moving said sleeve on said shaft.

2. An engine comprising a cylinder, a piston in said cylinder, means for creating a vacuum in said cylinder after the explosion of a charge, an inlet to said cylinder arranged to be opened on the outstroke of said piston to permit the entrance of a scavenging charge to said cylinder for displacing the products of combustion from the explosion end thereof, an outlet from said cylinder so arranged that approximately half the contents of said cylinder are expelled therethrough on approximately the first half of the instroke of said piston, means for supplying an explosive charge to said cylinder, said explosive charge and a portion of said scavenging charge being compressed on approximately the second half of the instroke of said piston, and means for exploding said compressed mixture.

3. An engine comprising a cylinder, a piston in said cylinder, means for creating a vacuum in said cylinder after the explosion of a charge, an inlet to said cylinder arranged to be opened on the outstroke of said piston to permit the entrance of a scavenging charge to said cylinder for displacing the products of combustion from the explosion end thereof, an outlet from said cylinder so arranged that approximately half the contents of said cylinder are expelled therethrough on approximately the first half of the instroke of said piston, means for supplying an explosive charge to said cylinder, said explosive charge and a portion of said scavenging charge being compressed on approximately the second half of the instroke of said piston, means for exploding said compressed mixture, and means for so controlling the outlet from said cylinder that the exit of said scavenging charge is temporarily retarded and the pressure in said cylinder is approximately doubled, whereby an explosion is caused at such time as to reverse the engine.

4. An engine comprising a working cylinder, a piston in said working cylinder, a vacuum-cylinder, a piston in said vacuum-cylinder, a communication between said working cylinder and said vacuum-cylinder arranged to be opened on the outstroke of the piston in said working cylinder to create a partial vacuum in said working cylinder, an inlet to said working cylinder arranged to be opened on the outstroke of the piston to permit the entrance of a scavenging charge for displacing the products of combustion from the explosion end of said working cylinder, an outlet from said working cylinder so arranged that approximately half the contents of said working cylinder are expelled therethrough on approximately the first half of the instroke of said piston, means for supplying an explosive charge to said working cylinder, said explosive charge and a portion of said scavenging charge being compressed on approximately the second half of the instroke of said piston, and means for exploding said compressed mixture.

5. An engine comprising a working cylinder, a piston in said working cylinder, a vacuum-cylinder, a piston in said vacuum-cylinder, a communication between said working cylinder and said vacuum-cylinder arranged to be opened on the outstroke of the piston in said working-cylinder to create a partial vacuum therein, an inlet to said working cylinder arranged to be opened on the outstroke of the piston to permit the entrance of a scavenging charge for displacing the products of combustion from the explosion end of said working cylinder, an outlet from said working cylinder so arranged that approximately half the contents of said working cylinder are expelled therethrough on approximately the first half of the instroke of said piston, means for supplying an explosive charge to said working cylinder, said explosive charge and a portion of said scavenging charge being compressed on approximately the second half of the instroke of said piston, means for exploding said compressed mixture, and means for so controlling the outlet from said working cylinder that the exit of said scavenging charge is temporarily prevented, whereby the pressure in said working cylinder is approximately doubled and an explosion is caused at such time as to reverse the engine.

In testimony whereof I have hereunto set my hand in presence of two subscribing witnesses.

ALFRED GEORGE MELHUISH.

Witnesses:
PERCY E. MATTOCKS,
WM. O. BROWN.